United States Patent
Vu

(10) Patent No.: US 7,120,717 B2
(45) Date of Patent: Oct. 10, 2006

(54) METHOD AND APPARATUS FOR CONTROLLING INTERRUPT STORMS

(75) Inventor: Paul Vu, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 331 days.

(21) Appl. No.: 10/779,017

(22) Filed: Feb. 13, 2004

(65) Prior Publication Data

US 2005/0182879 A1   Aug. 18, 2005

(51) Int. Cl.
  *G06F 13/24*   (2006.01)
(52) U.S. Cl. ................................ 710/262; 710/260
(58) Field of Classification Search ........... 710/260, 710/262
  See application file for complete search history.

(56) References Cited

U.S. PATENT DOCUMENTS

| | | | | |
|---|---|---|---|---|
| 5,542,076 | A  * | 7/1996 | Benson et al. | 710/260 |
| 6,931,553 | B1 * | 8/2005 | Plante et al. | 713/310 |
| 6,993,613 | B1 * | 1/2006 | Connor et al. | 710/260 |
| 2003/0145097 | A1 * | 7/2003 | Connor et al. | 709/232 |
| 2005/0022059 | A1 * | 1/2005 | Wei | 714/36 |

* cited by examiner

*Primary Examiner*—Rehana Perveen
*Assistant Examiner*—Jeremy S. Cerullo

(57) ABSTRACT

An apparatus and method for detecting and controlling interrupt storms in a computer system. More specifically, there is provided a method that comprises detecting whether or not a device is producing an interrupt storm, and if the device is producing an interrupt storm, disabling the interrupt being generated by the device, and a system for implementing the method.

29 Claims, 3 Drawing Sheets

METHOD AND APPARATUS FOR CONTROLLING INTERRUPT STORMS

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

A typical computer system communicates with a great number of internal and external devices in the course of normal operation. Interrupts are one way of organizing and controlling this communication. In an interrupt-based system, when a device requires attention from the computer's central processing unit ("CPU"), it generates an interrupt. When the CPU receives the interrupt it typically stops its current task and enters an interrupt mode to process the interrupt. Because the receipt of an interrupt causes the CPU to stop its current processing to address the interrupt, performance degradation may develop if the CPU receives so many interrupts that it is unable to efficiently complete execution of other tasks.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
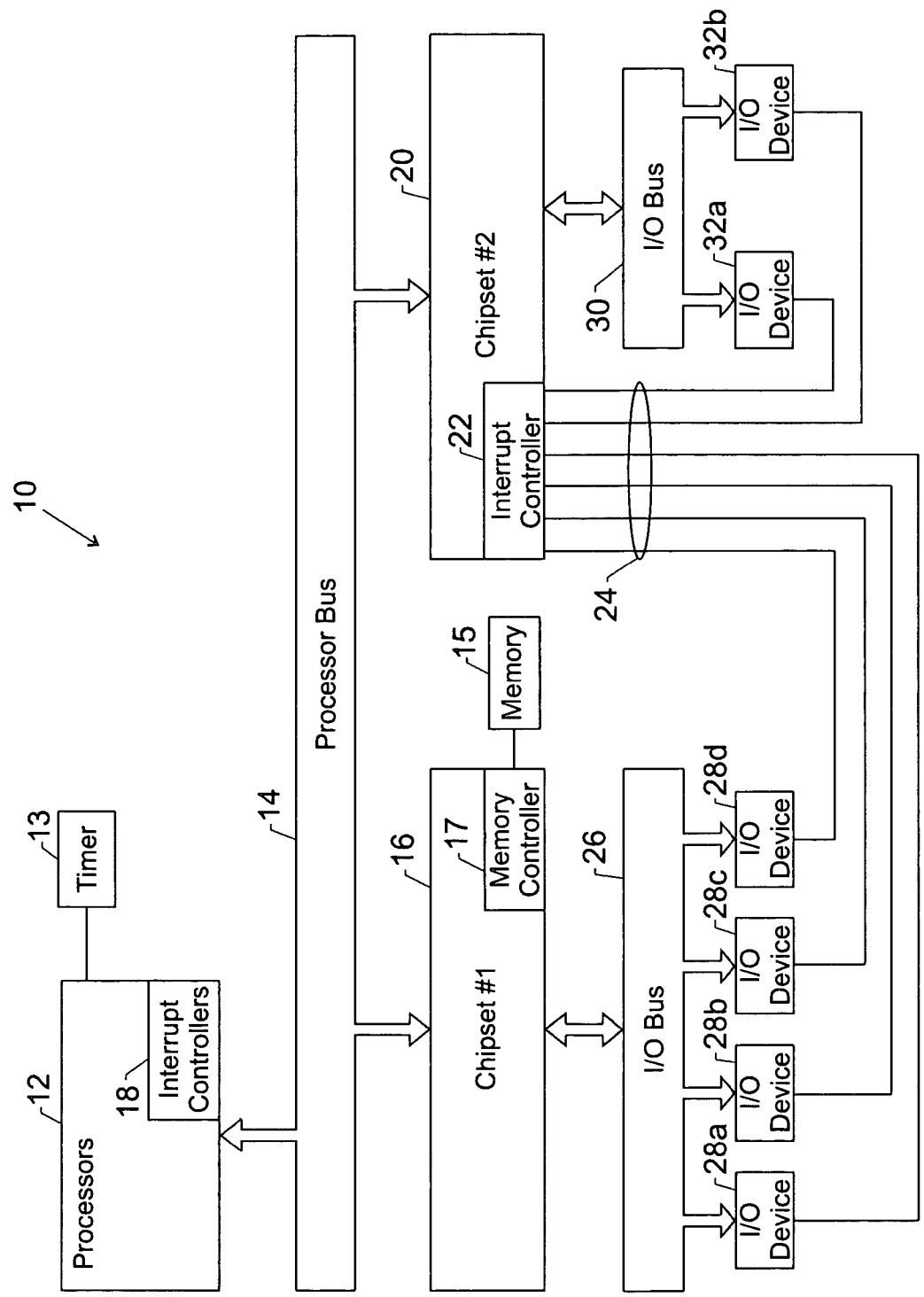
FIG. 1 is a block diagram illustrating an exemplary system for controlling interrupt storms in accordance with embodiments of the invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously discussed above, a typical computer system communicates with a great number of devices in the course of normal operation. These devices may include input output ("I/O") devices, (e.g., modems, disk drive controllers, or printers), memory devices (e.g., a memory controller or memory array), or any other device that produces an interrupt. Problems may develop, however, if one of the devices begins to generate a disproportionably large number of interrupts in a relatively short period of time. While this phenomenon, known as an "interrupt storm," can occur for a variety of reasons, it is typically linked to a malfunction of either one of the devices or another system resource that interacts often with one of the devices. For instance, an interrupt storm may occur if 1000 or more interrupts are received by the CPU in a span of less then one second. However, it should be noted that in defining an interrupt storm both the number of interrupts and the time span over which they are measured can vary greatly depending on system architecture and desired efficiency. For this reason, it will be appreciated by those skilled in the art that the characteristics of an interrupt storm can vary from system to system. Interrupt storms are generally characterized as events that disadvantageously cause performance degradation in the system.

As described above, interrupt storms are typically caused by a malfunction that affects one of the devices. A variety of malfunctions can produce an interrupt storm; two typical types will be discussed below. The first type of malfunction that may cause an interrupt storm is a device malfunction that causes the device to transmit a continuous stream of interrupts that are not based on any legitimate need by the device for CPU attention. This type of malfunction may be referred to as a "continuous malfunction." Unlike a device that is functioning properly, a device that has a continuous malfunction will not stop transmitting interrupts even when instructed to do so by the CPU. In other words, the device begins to transmit a continuous stream of interrupts that the system cannot shut down. The second type of device malfunction that typically results in an interrupt storm occurs if an uncorrectable error develops in a system component that the device accesses repeatedly. For example, if a fatal error develops in a memory cell that is accessed 3000 times per second by a device, the typical system will generate 3000 interrupts in response to this fatal error. Unlike the continuous malfunction described above, each of these interrupts is being generated for a legitimate reason (i.e. to notify the system of the fatal error). Unfortunately, as discussed below, the sheer number of interrupts generated can still adversely affect the system.

Either type of malfunction discussed above may cause an interrupt storm that can severely degrade overall system performance and efficiency. Each time the processor receives an interrupt it enters an interrupt mode, runs an interrupt handling routine, and then exits from the interrupt mode. During this time, the processor does not perform other computing tasks (i.e. normal processing is interrupted). If the processor receives a continuous stream of interrupts from a single device, it will be unable to perform any other tasks because as soon as the CPU finishes a particular interrupt and exits the interrupt mode, it will immediately receive another interrupt from the same device and have to reenter the interrupt mode. In this way, the interrupt storm can effectively shut down the CPU. A similar, although slightly less serious, effect occurs with the non-continuous form of interrupt storm. In this case, even though the CPU is not locked up by a continuous stream of interrupts, the processing time required to enter the interrupt mode, handle the interrupt, and then exit the interrupt mode (e.g., 3000 times per second), can severely diminish processor performance.

A more serious, and possibly catastrophic, problem can occur if the storming interrupt is a system management interrupt ("SMI"). Typically, only one processor can handle SMIs and all other CPUs in the system must stop processing while the SMI is processed. For this reason, an interrupt storm on one of the SMIs can drastically degrade system performance. In the case of a continuous malfunction on one of the SMIs, the entire system, as opposed to only one processor in a multiprocessor system, can be effectively shut down and may need to be rebooted.

Turning now to the drawings and referring initially to FIG. 1, a block diagram of an exemplary system for controlling an interrupt storm in accordance with embodiments of the invention is illustrated and generally designated by the reference numeral 10. The system 10 may include one or more processors or central processing units ("CPUs") 12. The CPU 12 may be used individually or in combination with other CPUs 12. While the CPU 12 will be referred to primarily in the singular, it will be understood by those skilled in the art that a system with any number of physical or logical CPUs 12 may be implemented. Examples of suitable processors include the Intel Pentium 4 Processor and the AMD Athlon Processor. Each processor may include a local interrupt controller 18 to handle interrupt requests that may be transmitted to the CPU 12. The structure of the local interrupt controller will vary based on the design of the processor. The CPU 12 may be operably coupled to one or more timers 13, which may be used to record the passage of time within the system 10. The CPU 12 may also be operably coupled to one or more processor buses 14. A first chipset 16 may also be operably coupled to the processor bus 14. The first chipset 16 is a communication pathway for signals between the processor and an input/output (I/O) bus 26 that is operably coupled to I/O devices 28a–28d. Depending on the configuration of the system, any one of a number of different signals may be transmitted through the first chipset 16. These signals include but are not limited to instructions from the processor 12, data, or interrupt requests from the I/O devices 28a–28d. Those skilled in the art will appreciate that the routing of signals throughout the system 10 can be readily adjusted without changing the underlying nature of the system.

The first chipset 16 may contain a memory controller 17 that may be operably coupled to memory 15. Alternate embodiments, in which the memory 15 is operably coupled to the processor bus 14 or in which the memory controller 17 is operably coupled to the first chipset 16, are also within the scope of the invention. The memory 15 may be any one of a number of industry standard memory types including but not limited to SIMMs and DIMMs. The memory 15 may facilitate controlling the interrupt storm by storing both instructions and data.

Further, as stated above, the first chipset 16 may be operably coupled to one or more of the I/O devices 28a–28d through to I/O bus 26. The I/O devices 28 may include, but are not limited to, displays, printers, and external storage devices. Each of the devices 28a–28d is connected to an interrupt line 24. There may be a dedicated interrupt line 24 for each of the devices 28a–28d or one or more of the devices 28a–28d may share a single one of the interrupt lines 24. The interrupt lines 24 may be operably coupled to a second chipset 20. In alternate embodiments, the interrupt lines may be operably coupled to either the I/O bus 26 or the first chipset 16.

Similar to the first chipset 16, the second chipset 20 may also be a communication pathway for signals exchanged between the processor and a second input/output ("I/O") bus 30 that is operably coupled to additional I/O devices 32a–32b. Depending on the configuration of the system, any one of a number of different signals may be transmitted through the second chipset 20. These signals may include, but are not limited to, instructions from the processor 12, interrupt requests from I/O devices 32a–32b, or data. It should also be noted that the second chipset 20 may also contain or be operably coupled to a memory controller and memory (not shown).

The second chipset 20 may also include an interrupt controller 22. Typically the interrupt controller 22 is any one of a number of industry standard Programmable Interrupt Controllers ("PICs") or Advanced Programmable Interrupt Controllers ("APICs"). The interrupt controller 22 and the local interrupt controller 18a–18d may work separately or in conjunction in the processing of system interrupts. The second chipset 20 may also be operably coupled to the processor bus 14 to facilitate communication with each of the processors 12.

Figure 2:
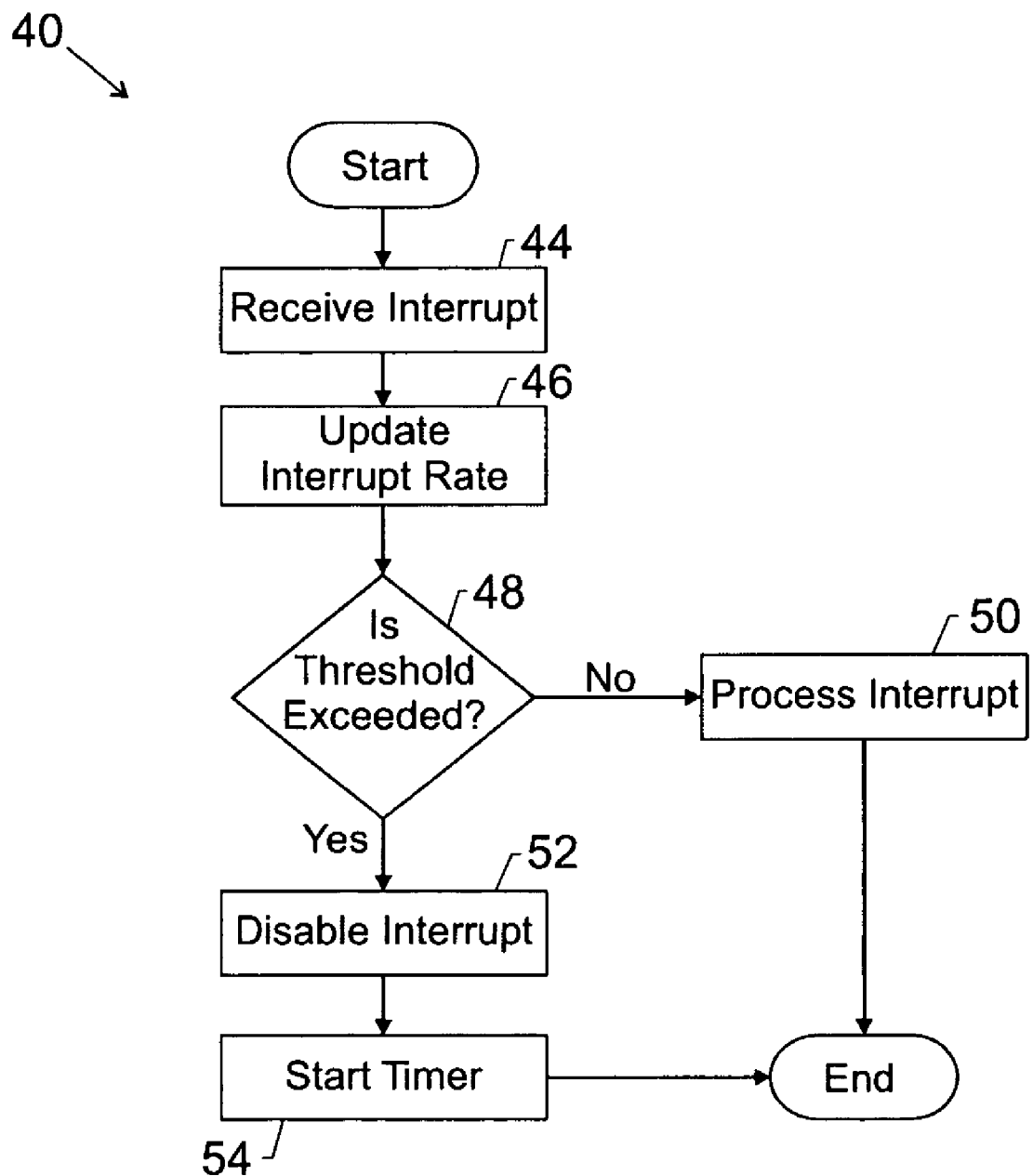
FIG. 2 is a flow chart illustrating an exemplary process for controlling interrupt storms in accordance with one embodiment of the invention.

Referring now to FIG. 2, a flow chart illustrating an exemplary process for controlling an interrupt storm in accordance with exemplary embodiments of the invention is depicted and generally referenced by the reference numeral 40. The process begins when the system receives an interrupt from a device as illustrated in block 44. The device may be any one of a number of parts of the system, including but not limited to, the chipset, 20, one of the I/O devices 28a–28d, 32a–32b, the interrupt controller 18, the memory controller 17, or a device in the memory 15. The system may receive the interrupt at any one of a number of components, including but not limited to, the I/O device 28a–28d and 32a–32b, the interrupt controller 18, the memory controller 17, or the CPU 12 via the host operating system. Upon receipt of the interrupt (block 44), the system will update an interrupt rate to reflect the interrupt as illustrated in block 46. The interrupt rate for a particular interrupt is the number of times that the particular device generated the interrupt over a period of time. For example, in the exemplary embodiment, the interrupt rate is the number of interrupt occurrences over the previous second. It will be appreciated by those skilled in the art that the period of time used to measure the interrupt rate can vary across a wide range depending on the system configuration, desired efficiency, or other system related factors.

Once the interrupt rate is updated (block 46), the interrupt rate is compared to a predetermined threshold, as illustrated by block 48. The interrupt rate threshold is system dependant and may be set higher or lower based on the system specific factors. In the exemplary embodiment, the interrupt rate threshold is 1000 interrupts per second. If the interrupt rate is below a pre-determined interrupt rate threshold, the interrupt will be processed normally as illustrated by block 50. If the interrupt rate has exceeded the interrupt rate threshold, the device is considered to be in an "interrupt storm", and the offending interrupt is accordingly disabled as illustrated in block 52.

Depending on the specific embodiment, the offending interrupt may be disabled in a variety of ways and by any one of a number of system components, such as the interrupt controller 18, the interrupt controller 22, the CPU 12, the chipset 16, the chipset 20 an I/O device 28a–28d, 32a–32b or a device in the memory 15, for instance. It will be appreciated by those skilled in the art that the system 10 may be configured to operate in accordance with any of the embodiments described below. For instance, in one embodiment, the interrupt may be disabled within the device that generated the interrupt (i.e. the device that generated the interrupt is the component that will disable the interrupt). In accordance with this embodiment, the device itself stops transmitting the interrupt signal. Another method of disabling the interrupt is to mask the offending interrupt in the interrupt controller 18. Here the interrupt controller 18, the component that will disable the interrupt in this embodiment, blocks the interrupt signal being generated by one of the devices and does not transmit the interrupt signal to the CPU 12. Still another method of blocking the interrupt can take place within the CPU 12, typically by way of the host operating system. In this embodiment, the CPU 12, the component that will disable the interrupt in this embodiment, is configured to not enter the interrupt mode when it receives the offending interrupt. By ignoring the offending interrupt signal, the CPU 12 essentially disables the interrupt signal. While these are the three most common ways of disabling the interrupt, it will appreciated by those skilled in the art that the interrupt signal can be effectively disabled at any one of several components throughout the system. The system may also produce a warning message or other notification indicating that the device was producing an interrupt storm.

Once the system 10 has disabled the storming interrupt, it will start a system timer 13 as illustrated in block 54. The timer 13 is configured to count down from a pre-determined period of time. The pre-determined period of time is determined by an operator and will depend on the system configuration, desired efficiency, and a variety of other factors. The pre-determined period of time is implemented to give the malfunction causing the interrupt storm a chance to either correct itself or be corrected. When the system timer expires, the system will recheck the device in the hope of being able to resume normal operation. In the present exemplary embodiment, the pre-determined period of time is 512 ms.

In another embodiment (not shown), the system may permanently disable the storming interrupt rather than start a system timer. For instance, if it is determined that there is an uncorrectable error on the interrupt line 24 or the associated device, it may be desirable to permanently disable the interrupt. While permanently disabling the interrupt is an effective method of controlling interrupt storm, it may not be preferred because the device or devices on that interrupt would be permanently cut off from the system.

When the system timer 13 reaches zero, the system 10 will need to determine if the device is still creating an interrupt storm. Two methods of determining whether the interrupt is still "storming" will be discussed below with reference to FIGS. 3 and 4. It will be appreciated by those skilled in the art, however, that there are a variety of methods to detect whether the device is still generating an interrupt storm.

Figure 3:
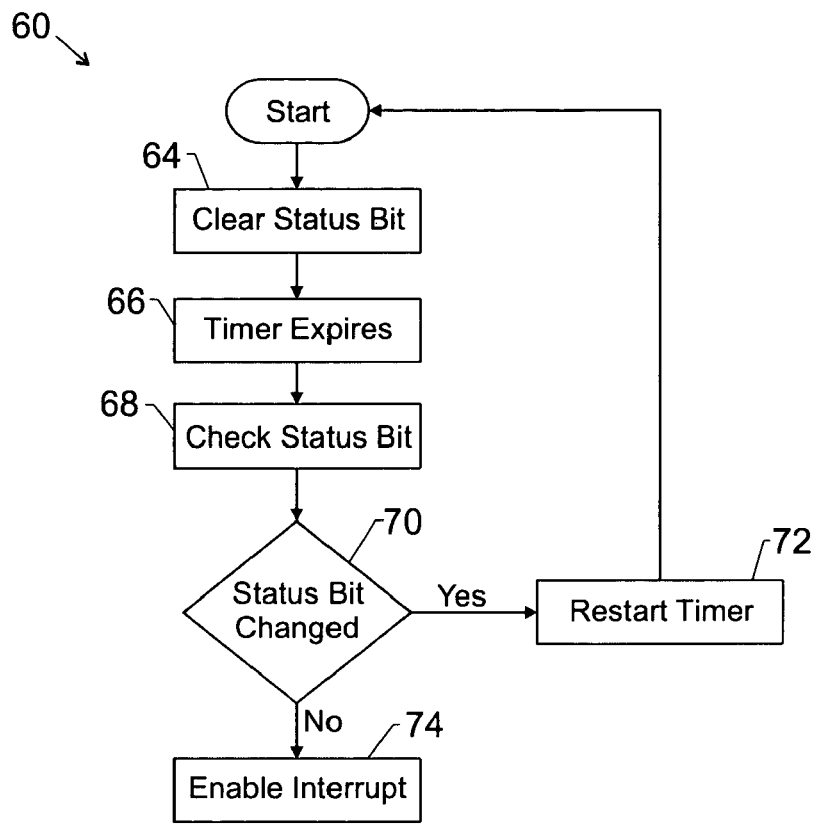
FIG. 3 is a flow chart illustrating an exemplary process for rechecking for an interrupt storm in accordance with embodiments of the invention.

Turning now to FIG. 3, a flow chart illustrating an exemplary process for rechecking for an interrupt storm in accordance with embodiments of the invention is depicted and generally designated by the reference numeral 60. FIG. 3 begins at a time just before the expiration of the system timer. Initially, the system 10 clears a status bit that corresponds to the offending interrupt as indicated in block 64. The status bit may be contained in a register on the device or elsewhere. The status bit is set by the device whenever the device asserts its interrupt. When the system timer expires as shown in block 66, the system 10 checks the condition of the status bit as indicated in block 68. Since the system has recently cleared the status bit (block 64), the status bit will be indicative of whether the device has generated an interrupt since the status bit was cleared (block 64). Thus, the system 10 determines whether the status bit has changed again as indicated in block 70. If the status bit is set, the system 10 concludes that the device is still producing an interrupt storm and restarts the system timer 13 in block 72.

Advantageously, during the exemplary process for rechecking, the system 10 does not have to process any interrupts from the storming device while non-storming device interrupts are processed normally. In other words, whereas in the initial detection process, the system 10 processes a certain number of repeated potentially illegitimate interrupts, 5000 for example, before it determines that the interrupt was storming, the recheck process shown in FIG. 3 does not processes a single interrupt because the interrupt itself is never enabled. For this reason, the method of recheck shown in FIG. 3 is very efficient and does not greatly affect system performance. For the process for rechecking shown in FIG. 3, the system 10 is only able to determine that the device is still generating interrupts and not whether the interrupt rate still exceeds the interrupt rate threshold. Since devices can produce interrupts for a variety of legitimate reasons, the method of rechecking for an interrupt storm shown in FIG. 3 may be unable to recognize that the device is no longer producing an interrupt storm. For instance, if the device generates a legitimate interrupt between the clearing of the status bit (block 64) and the checking of the status bit (block 68), the system 10 will conclude that the interrupt storm continues.

Returning again to FIG. 3, if the system timer 13 is restarted (block 72), the system 10 will start the entire process 60 again as the system timer 13 approaches the predetermined period of time. This loop may continue indefinitely as long as the device continues to generate interrupts in the time period between the clearing of the status bit (block 64) and the checking of the status bit (block 68). The system 10 may also be configured to produce a warning message or other notification when the system has performed a pre-determined number of loops through the process 60 without a change in the device. Similarly, the system 10 can be programmed to permanently disable the interrupt after looping through the process 60 for a pre-determined number of times. If on the other hand, the status bit remains clear (i.e., no additional interrupts were asserted between the clearing of the status bit (block 64) and the checking of the status bit (block 68), the system 10 will enable the interrupt as indicated in block 74, and subsequent interrupts will processed in accordance with the process 40 discussed above with reference to FIG. 2.

Figure 4:
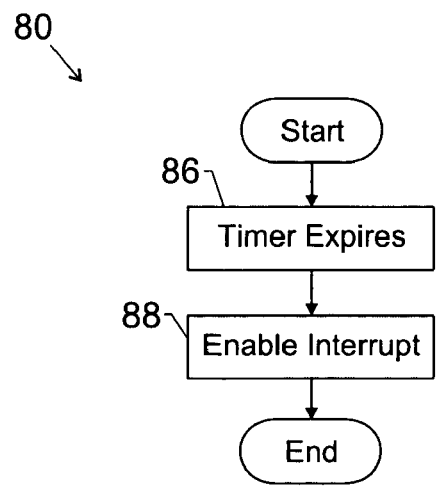
FIG. 4 is a flow chart illustrating another exemplary process for rechecking for an interrupt storms in accordance with embodiments of the invention.

Another method of rechecking for interrupt storming from the device is illustrated in FIG. 4. Turning now to FIG. 4, a flow chart illustrating an exemplary method of detecting an interrupt storm in accordance with embodiments of the invention is shown and generally designated by the reference numeral 80. As with process 60 shown in FIG. 3, the process 80 illustrated in FIG. 4 begins prior to the expiration of the system timer 13. When the timer expires, the system enables the interrupt (block 88). Once the interrupt is enabled, the system 10 will return to process 40 as discussed above with reference to FIG. 2. In effect, the process 80 is the process by which the system 10 resets itself and starts from scratch with respect to the device. If the interrupt is still storming, the process 40 (illustrated in FIG. 2) will detect the interrupt storm in the manner discussed above with regard to that process. In one embodiment, the system 10 may maintain a table for each of the devices indicative of the number of times that the system has needed to disable the interrupt associated with the device. In this embodiment, the system 10 may be set to permanently disable one of the devices if the device is disabled a pre-determined number of times in a particular time period.

Unlike the process 60 illustrated in FIG. 3, the process 80 for rechecking requires the processing of certain number of possibly illegitimate interrupts in order to determine if the interrupt rate still exceeds the interrupt rate threshold. For this reason, the process 80 may be less efficient than process 60. Unlike process 60, however, process 80 does ensure that the system 10 will enable the offending interrupt as soon as the interrupt rate falls below the interrupt rate threshold and the system timer 13 expires. Those skilled in the art will appreciate that different processes for rechecking for interrupt storming, whether one of the two described above or another, may be appropriate in different situations depending on the system components and the needs of the operator.

The base functions described above with reference to FIGS. 2, 3, and 4 may comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method comprising:
   detecting whether a device is producing an interrupt storm;
   if the device is producing an interrupt storm:
      disabling an interrupt being generated by the device; and
      starting a timer;
   after the timer expires, determining whether or not the device is still producing the interrupt storm;
   if the device is still producing the interrupt storm, restarting the timer; and
   if the device is no longer producing the interrupt storm, enabling the interrupt generated by the device.

2. The method as set forth in claim 1, wherein detecting whether a device is producing an interrupt storm comprises:
   receiving an interrupt from the device;
   determining a number of interrupts that have been received from the device over a period of time; and
   determining if the number of interrupts that have been received from the device over the period of time exceeds a threshold.

3. The method as set forth in claim 1, wherein determining whether or not the device is still producing the interrupt storm comprises checking an indicator indicative of whether or not the device is generating the interrupt storm.

4. The method as set forth in claim 1, comprising:
   if the device is still producing the interrupt storm restarting the timer.

5. The method as set forth in claim 1, comprising producing a notification that the device is producing the interrupt storm.

6. The method as set forth in claim 1, wherein detecting whether a device is producing an interrupt storm comprises detecting whether an I/O device is producing an interrupt storm.

7. The method as set forth in claim 1, wherein detecting whether a device is producing an interrupt storm comprises detecting whether a memory device is producing an interrupt storm.

8. A method comprising:
   receiving an interrupt;
   updating an interrupt rate to reflect receiving the interrupt;
   determining if the updated interrupt rate exceeds an interrupt rate threshold;
   if the interrupt rate exceeds the interrupt rate threshold:
      disabling the interrupt; and
      initiating a timer; and
   after an expiration of the timer:
      determining if the interrupt rate still exceeds the interrupt rate threshold;
      if the interrupt rate still exceeds the interrupt rate threshold, restarting the timer; and
      if the interrupt rate does not still exceed the interrupt rate threshold, enabling the interrupt.

9. The method as set forth in claim 8, comprising processing the interrupt if the interrupt rate does not exceed the interrupt rate threshold.

10. A computer-readable storage medium storing computer instructions for:
    detecting whether a device is producing an interrupt storm;
    if the device is producing an interrupt storm:
       disabling an interrupt being generated by the device; and
       starting a timer configured to count down to zero;
    after the timer counts down to zero, determining whether or not the device is still producing the interrupt storm;
    if the device is still producing the interrupt storm, restarting the timer; and
    if the device is no longer producing the interrupt storm, enabling the interrupt generated by the device.

11. The computer-readable storage medium as set forth in claim 10, wherein the instructions for detecting whether a device is producing an interrupt storm comprise instructions for:
    receiving an interrupt from the device;
    determining the number of interrupts that have been received from the device over a period of time; and
    determining if the number of interrupts that have been received from the device over the period of time exceeds a threshold.

12. The computer-readable storage medium as set forth in claim 10, wherein the instructions for detecting whether the device is producing an interrupt storm comprise instructions for checking an indicator indicative of whether or not the device is generating the interrupt storm.

13. The computer-readable storage medium as set forth in claim 10, comprising instructions for producing a notification that the device is producing the interrupt storm.

14. The computer-readable storage medium as set forth in claim 10, wherein the instructions for detecting whether a device is producing an interrupt storm comprise instructions for detecting whether an I/O device is producing an interrupt storm.

15. The computer-readable storage medium as set forth in claim 10, wherein the instructions for detecting whether a device is producing an interrupt storm comprise instructions for detecting whether a memory device is producing an interrupt storm.

16. A tangible storage medium comprising:
   a routine for receiving an interrupt;
   a routine for updating an interrupt rate to reflect receiving the interrupt;
   a routine for determining if the updated interrupt rate exceeds an interrupt rate threshold; and
   a routine for, disabling the interrupt and initiating a timer if the interrupt rate exceeds the interrupt rate threshold;
   a routine for determining if the interrupt rate still exceeds the interrupt rate threshold after an expiration of the timer;
   a routine for restarting the timer if the interrupt rate still exceeds the interrupt rate threshold; and
   a routine for enabling the interrupt if the interrupt rate does not still exceed the interrupt rate threshold.

17. The tangible storage medium as set forth in claim 16, comprising a routine for processing the interrupt if the interrupt rate does not exceed the interrupt rate threshold.

18. A computer system comprising:
   a first component configured to detect whether a device is producing an interrupt storm; and
   a second component configured to disable an interrupt if the first component detects an interrupt storm, wherein the second component is configured:
   to start a timer after disabling the interrupt;
   to restart the timer after the timer expires if the first component still detects the interrupt storm; and
   to enable the interrupt after the timer expires if the first component no longer detects the interrupt storm.

19. The computer system as set forth in claim 18, wherein the first component is a processor.

20. The computer system as set forth in claim 18, wherein the first component is a chipset.

21. The computer system as set forth in claim 18, wherein the first component is an interrupt controller.

22. The computer system as set forth in claim 18, wherein the first component is an I/O device.

23. The computer system as set forth in claim 18, wherein the first component is a memory device.

24. The computer system as set forth in claim 18, wherein the second component is a processor.

25. The computer system as set forth in claim 18, wherein the second component is an interrupt controller.

26. The computer system as set forth in claim 18, wherein the second component is a chipset.

27. The computer system as set forth in claim 18, wherein the second component is an I/O device.

28. The computer system as set forth in claim 18, wherein the second component is a memory device.

29. The computer system as set forth in claim 18, wherein the first component is further configured to:
   receive an interrupt from the device;
   determine the number of interrupts that have been received from the device over a period of time; and
   determine if the number of interrupts that have been received from the device over the period of time exceeds a threshold.

* * * * *